United States Patent
Cousino

[15] 3,657,868
[45] Apr. 25, 1972

[54] IMPACT ACTUATED MOWING MACHINE

[72] Inventor: Walter Frank Cousino, Toledo, Ohio
[73] Assignee: Thermad, Inc., Toledo, Ohio
[22] Filed: Mar. 23, 1970
[21] Appl. No.: 21,808

[52] U.S. Cl. ............................................ 56/13.6, 56/17.6
[51] Int. Cl. .................................................. A01d 35/00
[58] Field of Search ......................... 56/26.5, 259, 17.6, 13.6

[56] References Cited

UNITED STATES PATENTS

| 636,190 | 10/1899 | Williams | 56/259 |
| 318,692 | 5/1885 | Brown | 56/259 |
| 1,603,637 | 10/1926 | Ott | 56/17.6 |

*Primary Examiner*—Louis G. Mancene
*Assistant Examiner*—Gregory E. McNeill
*Attorney*—W. A. Schaich

[57] ABSTRACT

The invention relates to a driving system for a reciprocating blade type mower for farm or home usage wherein the linear motion of the reciprocating blades is imparted by rotary impact to provide substantially increased linear speed of the reciprocating blades to produce a cutting action by impact on grass or other vegetable matter as a desirable adjunct to the shearing action normally imparted by the cooperation of the cutting blades.

7 Claims, 3 Drawing Figures

INVENTOR.
WALTER F. COUSINO
BY
H. A. Schaich
ATTORNEY

IMPACT ACTUATED MOWING MACHINE

The rotary type lawn cutter, commonly driven by an internal combustion engine or electric motor of 5 horsepower or less has now completely dominated the market. These mowers rely upon the cutting action produced by a single blade rotating at a high speed. In fact, the term "cutting action" as applied to such blades is really an inconsistency because, as is well-known to any householder, such blades are effective to mow a lawn even though the cutting edge is quite dull, pitted, and deformed. The actual fact of the matter is that the speed of the blade is sufficiently high that the impact of the blade edge against the unsupported grass or other vegetation achieves the severance of the grass or vegetation by impact rather than by any true cutting action. Thus the need for constant sharpening of the mower blade has been substantially reduced or eliminated and there is no need for a complex power train, inasmuch as the rotary blade is generally coupled directly to the output shaft of the combustion engine or electric motor, as the case may be.

However, despite its popularity, the rotary lawn mower is subject to several well-known disadvantages. It has the dubious distinction of being very high on the list of domestic equipment which annually produces the most injuries to the American householder and his family. The high-speed rotating blade not only impacts and cuts grass or other vegetation, but when it hits any solid matter, such as a stone or a piece of a tree limb, it will send it flying away from the blade with considerable force. Literally thousands of people, both the operators of the mowers and innocent bystanders, have been injured by debris thrown from such mowers at high speeds. In an effort to make the mower safe, the manufacturers have resorted to housings having downwardly depending skirts surrounding the rotary path of the mower, but here again there are two necessary restrictions on such skirts:

1. They must be relatively open or shallow at the forward end of the mower to permit the grass to enter the cutting area of the blades in a relatively upright position.

2. A discharge area must be provided somewhere around the housing or the cut grass clippings will quickly pile up inside of the housing and render further operation of the mower impossible unless the accumulation of clippings is cleaned out from the housing, and this invites the careless operator to tilt the mower to lift the housing to expose what the trouble is and to attempt to clean out the housing without shutting off the engine and thus setting up the next accident. Many injuries have been produced by the operator inadvertently getting his foot too close to the edge of the housing so that it actually projects inside the housing and into contact with the high-speed blade. Many times the operator pushing the mower over uneven ground, and particularly on hillsides, slips and his foot slides under the housing, and a few more toes are lost.

The cutting effectiveness of a sickle bar type mower, i.e., a mower utilizing two relatively slow-moving rows of teeth to effect the desired cutting action, has long been recognized in the farming industry. The great bulk of mowers used to harvest hay, grain, and bean crops effect the cutting of the crop by a sickle bar type mower. This type cutting action could be made much safer for the average householder simply by narrowing the spaces between the cutting teeth so that it becomes effectively impossible for any relatively large object, such as a rock or a foot, to be inserted between the cutting teeth and thus produce an injury. But alas, with drive constructions heretofore employed for sickle bar type mowers, this type mower lost the economic battle because a relatively complicated drive train is required to convert the rotary motion of the power source to the reciprocating motion of the cutting teeth. Elimination of excessive vibration produced by the reciprocating motion is another problem. Furthermore, it is essential that these cutting teeth be continuously maintained in a sharpened condition, because their effectiveness is fully dependent upon the shearing action that they produce upon the vegetation trapped between two cooperating teeth. The sharpening of rows of cutting teeth is obviously beyond the skill of the average householder, and this is another reason why the sickle bar mower has never achieved wide acceptance in the domestic market.

Accordingly, it is an object of this invention to provide an improved construction and impact drive train for a sickle bar type mower which will permit such mower to be manufactured with the same economies as enjoyed by the rotary type mower and which will substantially reduce the need for maintenance of the cutting edges of the cutting teeth of such unit in sharpened condition.

A particular object of this invention is to provide a mower construction wherein two relatively reciprocable rows of cutting teeth are periodically linearly moved through a limited cutting stroke at high speed by the driving force imparted by impact from a rotary cam element.

Still another important object of this invention is to impart by impact a high velocity, short duration linear movement of the cutting teeth of a sickle bar type mower, so that the cutting action is produced as much by impact of the cutting teeth upon the contacted grass or vegetation as it is by shearing such between two relatively moving cutting surfaces.

Further objects and advantages of this invention will become apparent from the following detailed description thereof taken in conjunction with the annexed sheets of drawings, on which there is shown a preferred embodiment of this invention.

ON THE DRAWINGS

FIG. 3 is an enlarged scale detailed perspective view showing the method of mounting a spring between the two reciprocating cutter bars.

AS SHOWN ON THE DRAWINGS

Figure 1:
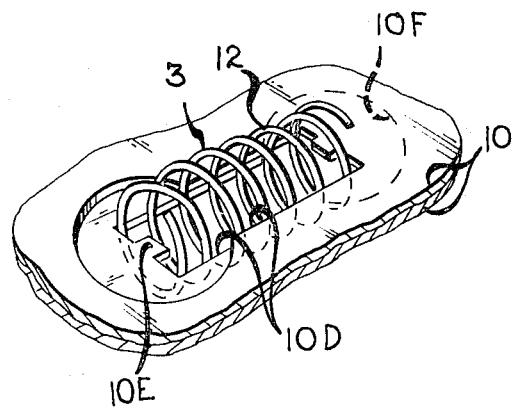
FIG. 1 is a perspective view, partly in section, of a lawn mower incorporating the features of this invention.
Figure 2:
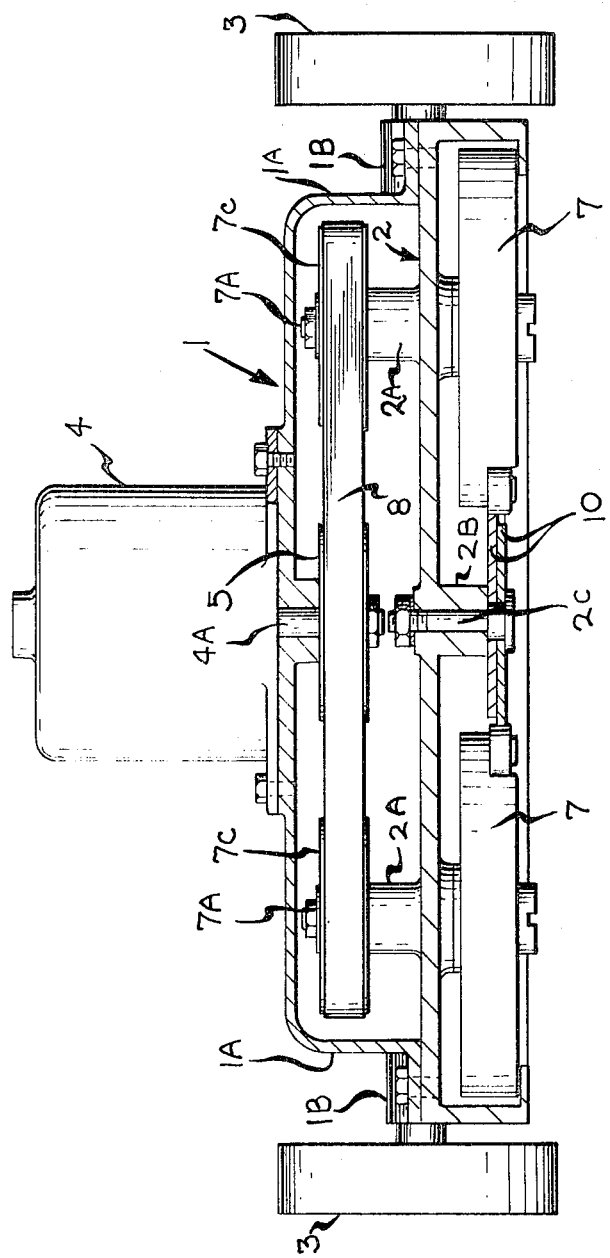
FIG. 2 is a multi-plane elevational sectional view of FIG. 1.

While not limited thereto, this invention will be described as applied to a common domestic lawn mower, it being recognized that the principles of this invention are applicable to other vegetation-cutting machines, such as agricultural mowers and hedge clippers.

As best shown in FIG. 3, the mower comprises a generally triangular housing 1 having depending side portions 1A, to which a triangular-shaped base housing member 2 is suitably secured. Adjacent two of its vertices, the housing 1 is provided with wheel bearing projections 1B, in which are suitably journalled shafts (not shown) for supporting ground-engaging wheels 3. Ground support for the unit is completed by a ground-engaging shoe 6 which is mounted in depending relationship to the base 2 at the trailing vertex of the generally triangular housing.

On the top surface of the housing 1 a suitable power source 4 is mounted, here shown as an electric motor mounted adjacent the rear vertex of the housing 1. The motor 4 is mounted with its shaft 4A in a vertical position and on the lower end of the shaft 4A, within the confines of housing 1, a drive gear 5 is secured.

The bottom plate 2 defines two bearing bosses 2A, each disposed adjacent the forward vertices of such base. A vertical shaft 7A is journalled in each of the bearing bosses 2A and on the bottom portion of such shaft a rotary actuating disc 7 is rigidly secured. The top end of each shaft 7A projects upwardly through the bearing boss 2A, and a driving gear 7C is there secured to such shaft. The driving gears 7g are synchronously driven by a flexible gear tooth belt 8 which passes around the periphery of primary driving gear 5 and around each of the peripheries of the secondary drive gears 7C.

Near the rearward vertex of the base housing 2, a depending bearing boss 2B is provided in which is mounted a pivot bolt 2C. Pivot bolt 2C provides pivotal support for the rear end of two substantially identical, light-weight T-shaped cutting plates 10. Each cutting plate is provided across the bar portion of its T-shaped configuration with a plurality of cutting teeth 10A, and when the two plates 10 are disposed in overlying contiguous relationship, the respective rows of cutting teeth 10A cooperate to produce an impact and cutting action upon any grass or vegetation trapped between the teeth.

The cutting plates 10 are supported for relative limited oscillatory movement about pivot pin 2C by a pair of guide bolts 11 (FIG. 1) which pass through aligned slots 10B respectively provided in the cutting plates 10 immediately behind the cutting teeth 10A. Bolts 11 are in turn respectively threaded into depending bosses 2E provided in the forward edge of the housing 2. Thus cutting plates 10 are positioned so that the cutting teeth 10A project beyond the front wall 2D of housing 2.

Suitable resilient means 12 are provided operating between the two cutting plates 10 to normally hold such plates in a position wherein the cutting teeth 10A of each plate are exactly aligned with the cutting teeth 10A of the other plate. For relatively low-speed reciprocating operation of the cutting plates 10, i.e., where the plates are reciprocated at a rate less than 3,000 movements per minute, such resilient means may comprise an ordinary spring 12 (FIG. 3) which is mounted in a recess defined by a pair of overlying slots 10D respectively provided in the cutting plates 10. For higher speeds, a rubber block may be preferable. Each of the cutting plates 10 has a spring guide projection 10E formed at one end of its slot 10D and an enlarged opening 10F at the other end of the slot 10D. The width of the central portion of the slots 10D is somewhat smaller than the normal diameter of the compression spring 12 which is mounted in the recess defined by such slots. Hence, the spring 12 is assembled in such recess by inserting it through the enlarged opening 10F provided at the one end of the slots 10D. In any event, the spring 12 functions to hold each of the cutting plates in its extreme lateral position defined by the cooperation of the guide bolts 11 respectively with the ends of the slots 10B, and, in this position, as mentioned before, the cutting teeth 10A are in exact alignment.

Relative reciprocating motion of the cutting teeth 10A is produced by an impact force derived from the actuating discs 7. For example, each of the cutting plates 10 is provided with a lateral cam projection or nub 10G extending toward the periphery of the adjacent disc 7. This projection 10G is preferably case-hardened or, alternatively, a thin layer of hardened material is welded to the side of plate 10 to provide a hardened lateral surface. An impact roller 7C is mounted on the periphery of each disc 7 as, for example, by a vertical pin 7D. The diameter of impact roller 7C is selected so as to impact the adjacent camming projection 10G of the respective cutting plate 10 and impart sufficient lateral motion to such cutting plate 10 so as to carry the cutting teeth 10A through a full cutting stroke. This does not mean, however, that the impact roller 7C must remain in contact with the cutting plate 10 throughout the entire cutting stroke but rather, that the impact force imparted to each cutting plate 10 will be sufficient to insure that such plate will complete its cutting stroke.

It will be noted that the two impact rollers 7C concurrently contact the respective cam projections 10G of the cutting plates 10 at the same time. While this is not a strict necessity, it is quite desirable inasmuch as the impact forces generated are then always exactly equal and opposite and vibration is thus substantially eliminated. It will also be obvious that more than one such impact roller 7C could be applied to the periphery of each of the impact discs 7 and, if so, the rotational speed of impact disc 7 could be either reduced, or the cutting plates 10 caused to oscillate at a greater frequency for the same rotational speed of the impact discs 7.

To operate the described cutting unit, a suitable handle (not shown) is attached to the housing 1 and the unit is advanced through grass or other vegetation with the motor 4 energized and thus driving the two impact discs 7 at synchronous speeds. Each time that the impact roller 7C contacts the respective camming projection 10G, a lateral impact force is applied to the respective camming plate 10 and it is moved laterally through the distance corresponding to the cutting stroke of the teeth 10A, or roughly the distance between two adjacent teeth 10A. Since the superimposed cutting teeth are thus concurrently rapidly moving toward each other, any vegetation positioned between such teeth will be impacted by the teeth and promptly severed thereby. It should be noted, however, that the severing action is produced more by the impact force that is possible with this type of driving arrangement than by actual action of the edges of the teeth 10A. Thus it is not essential for the successful operation of this type cutting unit for the teeth 10A to be maintained in a sharpened condition, although, of course, the sharpness of the teeth will increase the effectiveness of the cutting action.

During such cutting movement, the spring 12 is compressed and functions to promptly return the respective cutting plates 10 to their normal position wherein the cutting teeth 10A are respectively aligned.

The difference between the severing action produced by this type mower over that produced by a conventional sickle bar mower can be best illustrated by considering some specific examples of speed of actuation of the cutting teeth 10A. In the conventional sickle bar mower, such teeth are continuously moving through their reciprocatory path. No sooner do they reach one extremity of their reciprocatory path than they immediately start their return movement. As a result, the cutting blades are only in their aligned position for a very small fraction of the total time. At all other times, the blades are either partially or fully misaligned. As a result, if the speed of reciprocation of the blades is very high, it is apparent that it is a practical impossibility for grass or other vegetation to enter between the cutting teeth.

In contrast, in mowers embodying the principles of this invention, the impact imparted to the cutting blades is generally limited to about three degrees of the total rotational path of the impact disc 7. Assuming that the blades return to their normally open position under the influence of the spring 12 in an equal time interval, it is apparent that for each 360° rotation of the impact disc 7, the cutting blades are displaced from their normally open position only 6°, or one-sixtieth of the total time. Thus, as a general statement, the cutting blades are maintained in a stationary open position more than half of the total time. Thus, there is every opportunity for the grass or other vegetation to be cut to enter between the spaces defined by the opened teeth, and, in this position, since the grass or vegetation is simultaneously impacted from opposite sides by the cutting teeth, it is apparent that the impact severance efficiency of such cutting teeth is extremely high and in no manner depends upon the degree of sharpness of the edges of such teeth.

Additionally, the safety achieved in operating a mower of this type is outstanding. For a domestic lawn mower, the openings between the aligned teeth could be on the order of one-eighth to one-fourth of an inch. It thus becomes virtually impossible for any larger sized object, such as a rock, a shoe, a tree branch, or even a finger to be inserted between such openings. Furthermore, since the stroke of each cutting blade is so very limited, namely, to the same distance as the spacing of the cutting teeth, there is no possibility of any solid object which happens to be impacted by the moving blade to be thrown any substantial distance. Thus a mower embodying this invention will inherently be much safer, not only for the operator but also for the bystander.

Lastly, it should be readily apparent that the mower can be moved right up against the edge of a house or a fence or concrete wall and achieve cutting of any vegetation located close to these obstacles, without any danger of damaging the house, fence, wall, or the mower. At the same time, the overall construction of the mower is sufficiently simple that it can be manufactured at a cost to permit it to economically compete with the popular, but dangerous, single rotating blade type mower.

As will be evident to those skilled in the art, modifications of this invention can be made in the light of the foregoing disclosure without departing from the scope of the appended claims.

I claim:

1. A reciprocating mower comprising a pair of plates, each plate having a row of cutting teeth along an edge thereof, means for mounting said plates in overlying relationship, with said cutting teeth aligned in shearing relationship, said last-mentioned means permitting limited lateral relative movement of said plates sufficient to relatively move said teeth a distance substantially equal to the spacing of said teeth, resilient means for normally positioning said plates in a position with said teeth aligned and open, a power-driven rotating actuator, and means on at least one of said plates normally disposed in the path of rotation of said actuator to be intermittently impacted thereby and momentarily displaced by impact to relatively move said teeth through a cutting stroke, said teeth being stationary and in their aligned, open position more than half the time.

2. A reciprocating mower comprising a pair of generally T-shaped plates disposed in overlying relationship, each plate having a row of cutting teeth along the bar portion of the "T," pivot means pivotally connecting said plates adjacent the stem end of the "T," whereby relative pivotal reciprocation of said plates produces relative cutting motion of said teeth, resilient means urging said plates to a normal position wherein said cutting teeth are respectively aligned, a power-driven actuator rotating about an axis parallel to the axis of said pivot means, and means on at least one of said plates normally disposed in the path of rotation of said actuator to be intermittently impacted thereby and momentarily displaced by impact to relatively move said plates through a cutting stroke, said teeth being stationary and in their aligned, open position more than half the time.

3. A reciprocating mower comprising two longitudinal rows of cutting teeth disposed in juxtaposition and relatively movable through a cutting stroke, resilient means operating between said two rows of cutting teeth to normally hold said teeth in an aligned open position, a power driven rotating actuator, and striker means operatively connected to at least one of said cutting teeth rows, said striker means being disposed in the rotary path of said actuator to be intermittently impacted thereby and momentarily radially displaced by impact whereby a cutting stroke is imparted to said cutting teeth, said teeth being stationary and in their aligned, open position more than half the time.

4. A reciprocating mower comprising two longitudinal rows of cutting teeth disposed in juxtaposition and relatively movable through a cutting stroke, a pair of power driven synchronously rotatable actuator discs, a pair of rollers respectively carried by said discs, and a pair of striker means respectively operatively connected to said cutting teeth rows and each disposed in the rotary path of said rollers in diametrically opposed relationship, whereby said striker means are respectively concurrently impacted and radially displaced by said rollers solely by impact to momentarily move said rows of cutting teeth through a cutting stroke, whereby said cutting teeth are intermittently reciprocated but are stationary more than half the time.

5. The combination defined in claim 4, plus resilient means operating between said two rows of cutting teeth to normally hold said teeth in an aligned open position.

6. A lawnmower comprising, in combination:
  1. A generally triangularly shaped hollow housing having a pair of ground engaging wheels rotatably journalled adjacent two vertices;
  2. A pair of generally T-shaped plates disposed in overlying relationship, each plate having a row of cutting teeth along the bar portion of the "T";
  3. Pivot means in said housing adjacent the third or rear vertex of said housing traversing the ends of the stem portions of said T-shaped plates, thereby positioning said plates with said cutting teeth projecting beyond the forward edge of said housing and permitting relative pivotal reciprocation of said plates to relatively move said cutting teeth through a cutting stroke;
  4. A pair of discs respectively journalled in said housing on opposite sides of said stem portions of plates for rotation about vertical axes;
  5. A prime mover mounted on the top of said housing;
  6. Power transmission means connecting said prime mover to said discs to synchronously rotate said discs;
  7. An impact roller carried on the periphery of each disc; and
  8. A lateral projection on the stem portion of each said plate disposed in the path of rotation of the adjacent impact roller to be impacted thereby, whereby a cutting stroke is momentarily imparted to said cutting teeth.

7. The combination defined in claim 6, plus resilient means operating between said plates to normally hold said cutting teeth in an aligned, open position.

* * * * *